(12) United States Patent
Wilbert et al.

(10) Patent No.: US 12,326,958 B2
(45) Date of Patent: Jun. 10, 2025

(54) PRIVACY VAULT

(71) Applicant: SAP SE, Walldorf (DE)

(72) Inventors: Anja Wilbert, Munich (DE); Oliver Latka, Penzberg (DE)

(73) Assignee: SAP SE, Walldorf (DE)

( * ) Notice: Subject to any disclaimer, the term of this patent is extended or adjusted under 35 U.S.C. 154(b) by 292 days.

(21) Appl. No.: 18/069,409

(22) Filed: Dec. 21, 2022

(65) Prior Publication Data

US 2024/0211624 A1 Jun. 27, 2024

(51) Int. Cl.
*G06F 21/62* (2013.01)

(52) U.S. Cl.
CPC ................ *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 9,632,851 B1* | 4/2017 | Johansson | G06F 3/0482 |
| 10,958,599 B1* | 3/2021 | Penov | G06F 16/9535 |
| 2009/0171760 A1* | 7/2009 | Aarnio | G06Q 30/02 |
| | | | 709/219 |
| 2016/0034990 A1* | 2/2016 | Kannair | H04L 63/083 |
| | | | 705/26.35 |
| 2019/0319932 A1* | 10/2019 | Kandregula | H04L 67/306 |
| 2022/0103494 A1* | 3/2022 | Crass | G06Q 10/10 |

* cited by examiner

*Primary Examiner* — Vu V Tran
(74) *Attorney, Agent, or Firm* — Buckley, Maschoff & Talwalkar LLC

(57) ABSTRACT

Systems and methods include reception of a first user interface from a data requestor, display of the first user interface on a display, launch of an application to provide the requested data, display of a second user interface of the application overlaid on the first user interface, reception of identifiers of shareable data from a data provider and display of the identifiers in the second user interface, reception of an indication, via the second user interface, of a set of the shareable data to share with the data requestor, transmission of an authorization to the data provider to store the set of shareable data in a data storage, and transmission of a second authorization to the data storage to share the set of shareable data with the data requestor.

17 Claims, 10 Drawing Sheets

PRIVACY VAULT

BACKGROUND

Modern enterprise computing systems often consist of a landscape of applications and data stores which operate to provide functionality to the members and users (e.g., customers) of an enterprise. The data stores typically store data which is related to users, and which is intended to facilitate processing of transactions associated with the users. This data may also be used to better understand the users' needs and to provide personalized service to users.

Generally, a user is associated with a separate identity maintained by each enterprise. The user has little control over the data which an enterprise associates with her identity. In order to facilitate transactions with several different enterprises, the user must separately provide her data to each enterprise. Moreover, the user is required to authenticate herself to the enterprise in order to access the user's own associated data.

No satisfactory system exists for user-directed transmission of credentials from a credential-issuing enterprise to another enterprise. Such credentials may include, for example, educational qualifications (e.g., a university degree), licensing certifications (e.g., a driver's license), and governmental documentation (e.g., a passport). Consequently, credential submission and verification are still largely performed offline using paper and therefore cannot be incorporated into digital workflows.

An enterprise typically has access to and therefore stores only a partial representation of the universe of digital data which is associated with a given user. An enterprise may be incented to store less than all the data to which the enterprise has access in order to limit the attractiveness of the stored data to data piracy and the concomitant liability. Increasing governmental requirements on what user-specific data may be stored, how the data may be used, and the duration of such storage further shrink the amount of data usable by enterprises. The data associated with a given user may also change over time, causing the corresponding data stored by an enterprise to become outdated because the enterprise-stored data is only updated by direct interactions between the enterprise and the user. The foregoing factors limit the insights which might otherwise be gleaned from user data.

While user-specific data is vital for allowing an enterprise to perform necessary and desired processes, users are less and less likely to share all requested data by default. Moreover, users desire control over data usage, flow, access periods, value, and insights derived therefrom. Systems are needed to efficiently share private data and credentials.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments provide an application to enable secure and user-consented exchange of data between enterprises. Enterprise- and user-generated data may be added to an aggregated user profile and selectively shared by a user. In some embodiments, users retain ownership and control over their data and are able to receive value in exchange for shared data. Embodiments may also facilitate hyper-personalization of enterprise services and/or creation of new enterprise services which were previously not possible Some embodiments include a user application for performing an authentication process between a user and a provider of user data. The user application presents user data stored by the provider and which may be shared by the user. The user application also allows the user to select data for sharing, an entity with which to share the data, and a specific timeframe during which the data may be shared with the entity. The data provider is instructed by the application to transmit the selected data to a user-specific decentralized storage and the application informs the data storage to allow the selected entity to access the selected data.

Figure 1:
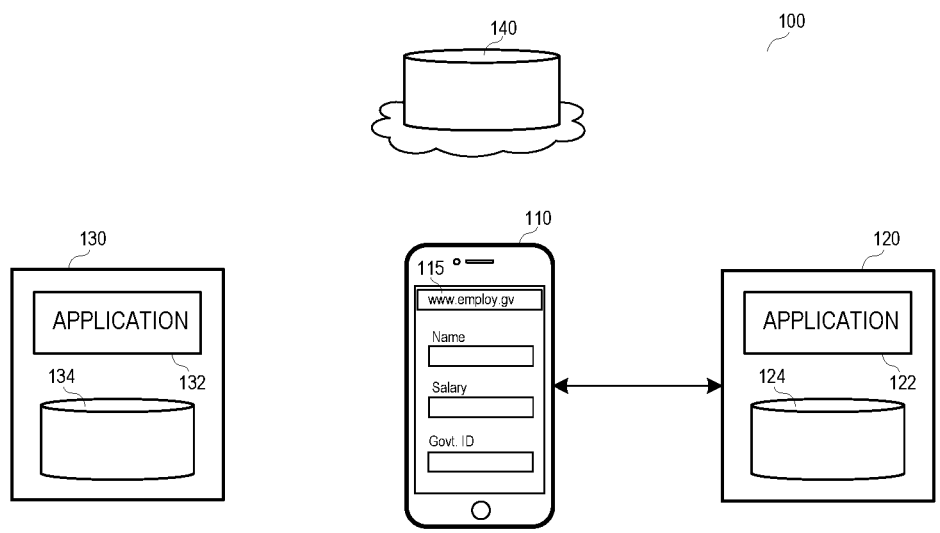
FIG. 1 is a block diagram illustrating a request for user data according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service). A cloud-based implementation of any elements of system 100 may apportion computing resources elastically according to demand, need, price, and/or any other metric.

Architecture 100 includes user device 110. User device 110 may comprise any suitable computing device, including but not limited to a smartphone, a desktop computer, and a laptop computer. User device 110 includes one or more processing units (e.g., Central Processing Units (CPUs), processor cores, processor threads) for executing program code of any number of applications. Such an application may execute directly on an operating system of user device 110 or may, for example, comprise a Web application executing within a virtual machine of a Web browser executed by user device 110.

An application executed by user device 110 according to some embodiments may provide a verifiable identity of a user of user device 110 to third-party applications. Such an application may implement OpenID Connect (OIDC), an identity layer built on top of the OAuth 2.0 framework. OIDC uses JSON web tokens (JWTs) to allow third-party applications to verify the identity of an end-user and to obtain basic user profile information.

User device 110 of FIG. 1 presents interface 115 of an application executing on user device 110. The application of user interface 115 may comprise a client application of application 122 executing on platform 120. In some embodiments, the client application is a Web browser (or a Web app executing therein) and application 122 is a Web service or website from which the Web browser receives data for display. Platform 120 may comprise an on-premise, cloud-based, or hybrid computing platform providing an execution platform and services to software applications. Platform 120 may comprise one or more virtual machines executing program code of an application server.

With respect to the above examples, user interface 115 may comprise a Web page received from application 122 in response to a HTTP request sent to a URL of application 122. The input fields of user interface 115 request user information including Name, Salary, and Government ID. In this regard, application 122 may be executed by an Employment Services department of a governmental agency. Embodiments are not limited thereto.

Platform 130 may also comprise an on-premise, cloud-based, or hybrid computing platform providing an execution platform and services to software applications, and may comprise one or more virtual machines executing program code of an application server. Application 132 may be executed by an enterprise different from the enterprise executing application 122. Application 132 may be executed by an enterprise which possesses information associated with the user of user device 110. This information may be stored in storage 134, which may be implemented by any storage system that is or becomes known. For example, application 132 may be executed by an airline which possesses loyalty program information associated with the user, by an employer of the user which stores salary data for the user, by a governmental agency in charge of issuing drivers' license or passports, or a university including degree and transcript information associated with the user.

Personal data storage 140 may comprise a data lake or implement any other data storage paradigm that is or becomes known. Personal data storage 140 may store data specific to many different users in a secure siloed manner. That is, data which is stored in personal data storage 140 and specific to a particular user is only accessible to the particular user. The particular user may also consent to access to specific portions of the user-specific data by specific third parties for specific time periods as will be described below.

Personal data storage 140 may store, for example, user-specified data, personal identifying information, consents, and third-party verified information, but embodiments are not limited thereto. Self-specified data may include data which a user has provided for storage in personal data storage 140. Self-specified data may comprise user preferences (e.g., travel, meal, operating system).

Personal identifying information may include any information that permits the identity of a user to be reasonably inferred by either direct or indirect means. Personal identifying information may include but is not limited to a social security number, a passport number, an address, a telephone number, and a full name. Personal identifying information may also be specified by a user.

Continuing the FIG. 1 example, it is assumed that the user of user device 110 wishes to provide the information requested via user interface 115 by a data requestor executing application 122. As noted, the requested information includes salary information. It will further be assumed that application 132 is executed by a former employer of the user, which possesses the salary information.

As shown, the former employer provides QR code 135 to the user, for example within a termination letter provided to the user. User device 110 scans QR code 135 and, in response, presents user interface 200 overlaid on user interface 115. User interface 200 comprises a user interface of a second application executing on user device 110, named in the present example "Trade My Data". The second application may comprise a standard application or an "App Clip".

Generally, an App Clip is a small version of a smartphone application that is downloadable on-the-fly. An App Clip isn't downloaded from a store, rather it is invoked in response to an action that opens the App Clip. Such actions may include scanning a QR code or an NFC tag, clicking a link in a messaging app, or selecting a Smart App banner on a webpage. Once an App Clip is invoked, the binary of the App Clip is downloaded in the background and the operating system displays a prompt asking the user to open the App Clip. The URL which triggered the invocation is passed to the App Clip to provide context for the current transaction.

In the present example, QR code 135 includes a request for authentication with application 132 and a request for a list of shareable data which may be provided by application 132. Embodiments may utilize an authentication method of a globally unique persistent identifier that does not require a centralized registration authority because it is generated and/or registered cryptographically, such as a Decentralized Identifier (DID). For example, DID Auth is an authentication method which relies on a challenge-response cycle in which a relying party authenticates the DID of an identity owner. During this cycle, an identity owner demonstrates control of their authentication material that was generated and distributed during DID Record Creation through execution of an authentication-proof mechanism. The proofs may be stored in a verifiable data registry (e.g., trusted databases, decentralized databases, government ID databases, and distributed ledgers) accessible to all parties such as but not limited to a distributed ledger.

The request for authentication may comprise a DID authentication challenge to application 132. QR code 135 encodes the DID authentication challenge and user device 110 is configured to open the Trade My Data application to process such challenges. The shareable data may be requested within the DID challenge as is known in the art.

Alternatively, the data may be requested by the Trade My Data application after successful authentication with application 132.

Figure 2:
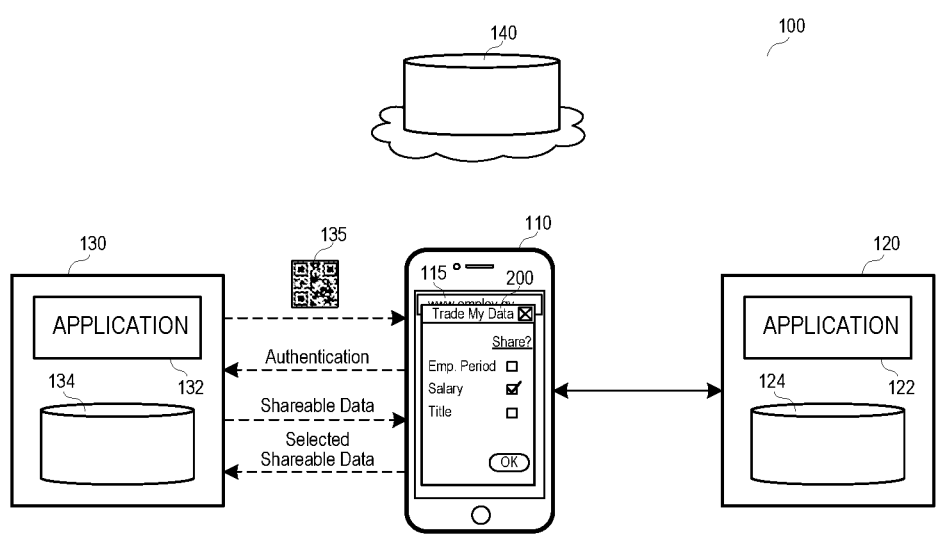
FIG. 2 is a block diagram illustrating designation of verified user data for sharing with a data requestor according to some embodiments.

User interface 200 lists the user-associated shareable data indicated by application 132. The data in the present example includes Employment Period, Salary and Title. Embodiments are not limited thereto. User interface 200 includes checkboxes which allow the user to independently select one or more of the shareable data to share with application 122. The user has selected Salary in FIG. 2, and any number of the listed shareable data (including none) may be selected. Embodiments may employ any user interface metaphor for data selection.

Figure 3:
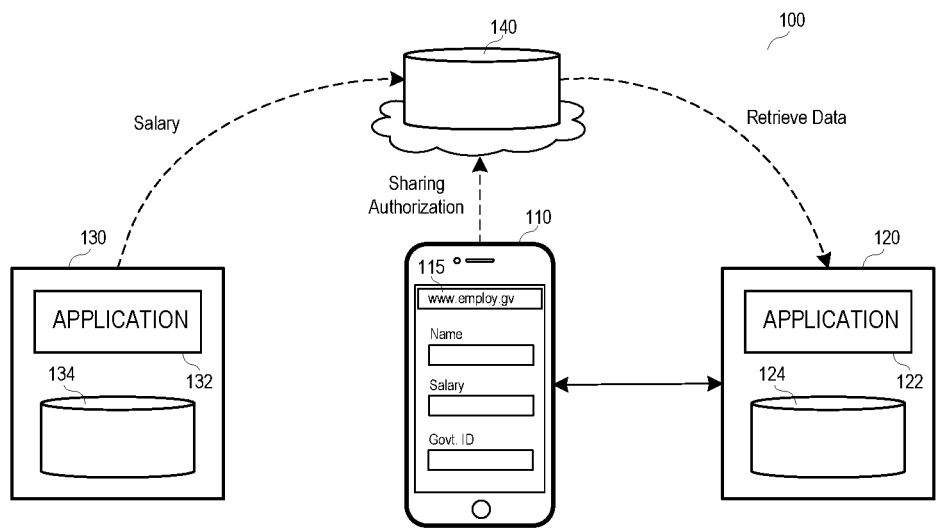
FIG. 3 is a block diagram illustrating authorized sharing of verified user data with a data requestor according to some embodiments.

The user selects the OK control of user interface 200 according to some embodiments. As shown, the Trade My Data application returns identifiers of the selected shareable data to application 132 in response. Next, application 132 transmits the selected shareable data to storage 140 as shown in FIG. 3. Transmission of the selected shareable data to storage 140 may include authentication of application 132 in order to ensure that the data is received from a trusted authority. The shareable data is stored in data storage 140 in association with an identifier of the user of user device 110. Application 132 may determine such an identifier during authentication with the Trade My Data application.

Also shown in FIG. 3 is user interface 115, with user interface 200 having been dismissed. In this regard, upon selection of the OK control of user interface 200, the Trade My Data application may dismiss its user interface and transmit an indication to data storage 140 to share the selected shareable data with application 122. FIG. 3 also shows retrieval of the data by application 122 from data storage 140. Application 122 may query data storage 140 for the data, and data storage 140 may provide the data in view of the prior consent received from the Trade My Data application to share this data with application 122.

Figure 4:
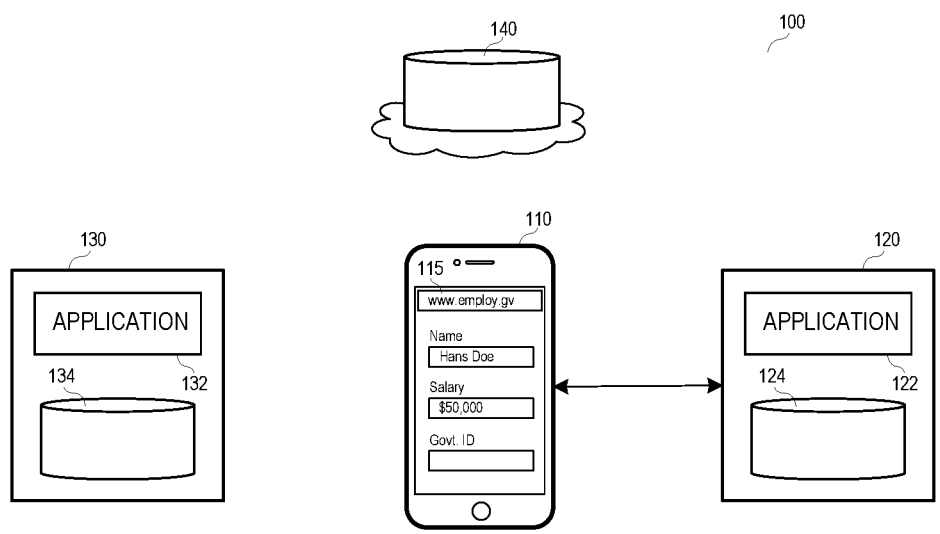
FIG. 4 is a block diagram illustrating shared verified user data acquired by a data requestor according to some embodiments.

FIG. 4 illustrates user interface 115 of application 122 including populated Name and Salary fields. The Name field may be populated by the user via interaction with user interface 115, and the Salary field may be populated by application 122 based on the salary data received from data storage 140 as described above. Accordingly, the user may easily control sharing of salary data from a former employer to an employment services governmental agency, and the agency may rely on the validity of the salary data because it comes directly from the former employer.

In an alternative embodiment, and in addition to the transmission of the data from application 132 to storage 140 and from storage 140 to application 122, selection of the OK control of user interface 200 causes application 132 to transmit the shareable data directly to the Trade My Data application on user device 110. The Trade My Data application may then populate user interface 115 directly with the received data.

Figure 5:
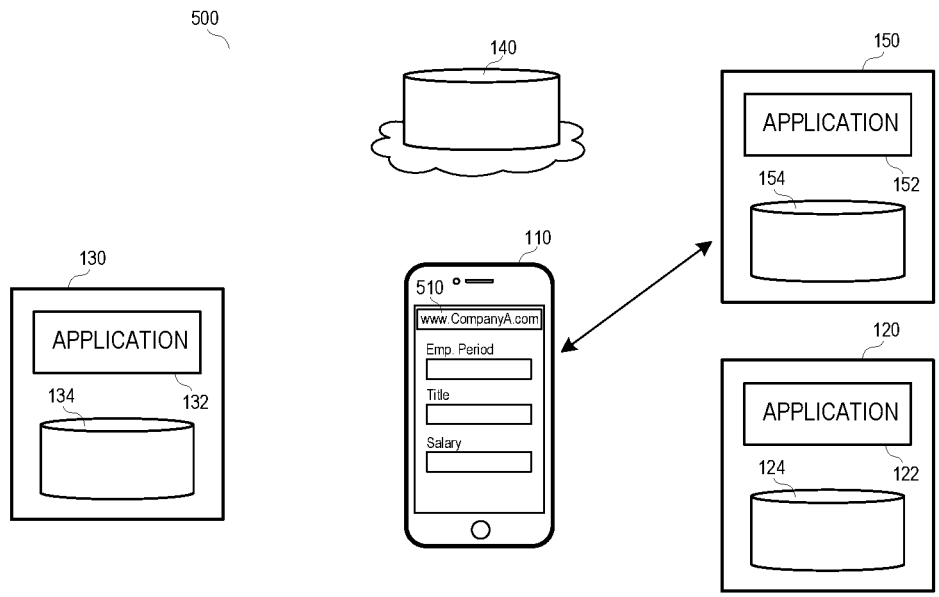
FIG. 5 is a block diagram illustrating a request for user data according to some embodiments.

FIG. 5 illustrates architecture 500 which includes platform 150 in addition to the components of architecture 100. Platform 150 may comprise application 152 which also desires validated data from a user of user device 110. For example, application 152 may comprise a recruiting application executed by a potential employer with which the user wishes to initiate a recruiting process.

Accordingly, the user may enter a URL of application 152 into a Web browser executing on user device 110 to access user interface 510. User interface 150 may comprise a Web page received from application 152 in response to an HTTP request received from user device 110. The input fields of user interface 510 request user information including Employment Period, Title and Salary.

Since at least some of the requested information is managed by application 132 as described above, user device 110 again scans QR code 135, resulting in presentation of user interface 200 of the Trade My Data application overlaid on user interface 115. As mentioned above, QR code 135 includes a request for authentication with application 132 and a request for a list of shareable data which may be provided by application 132.

Figure 6:
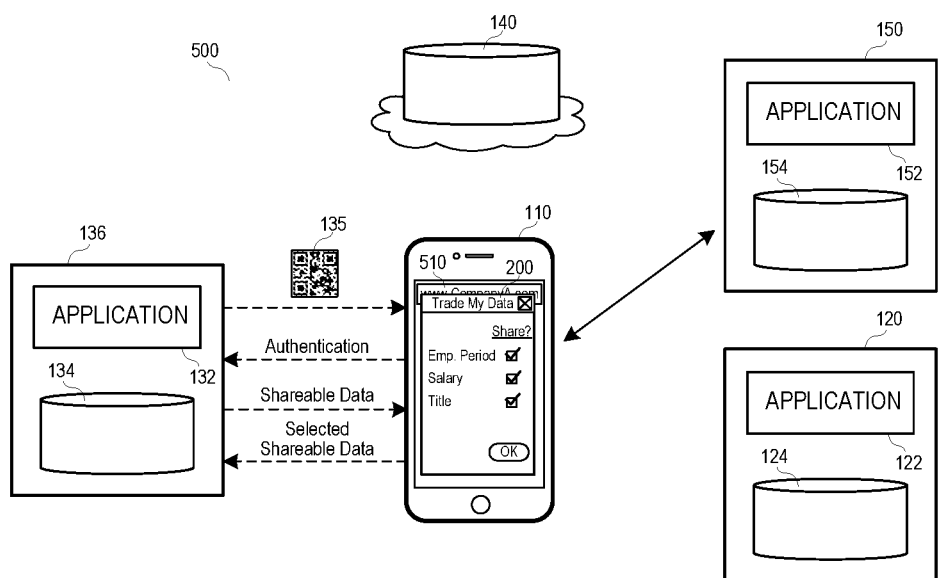
FIG. 6 is a block diagram illustrating designation of verified user data for sharing with a data requestor according to some embodiments.

User interface 200 lists the user-associated shareable data indicated by application 132. In the example of FIG. 6, the user has selected all the listed shareable data. After the user selects the OK control of user interface 200, the Trade My Data application returns identifiers of the selected shareable data to application 132.

Figure 7:
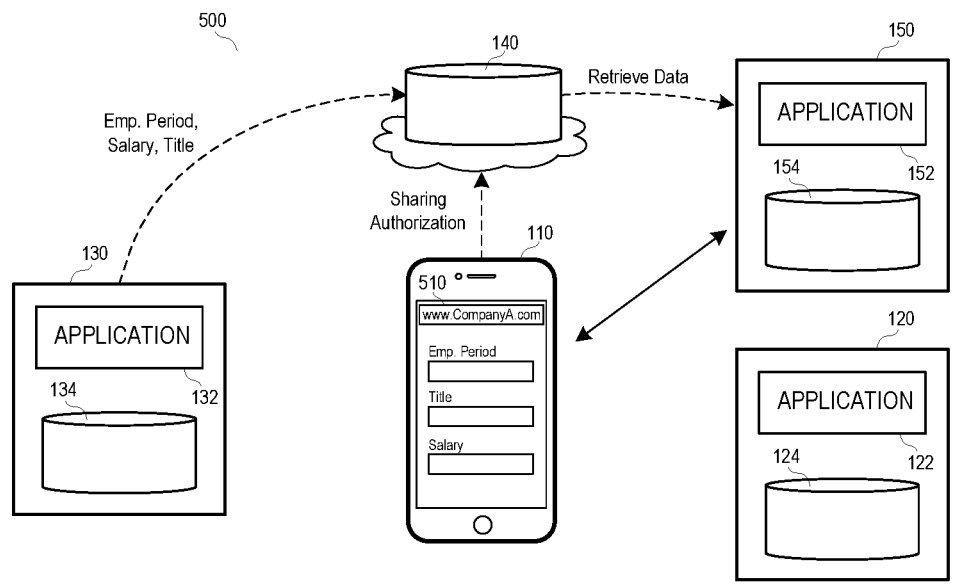
FIG. 7 is a block diagram illustrating authorized sharing of verified user data with a data requestor according to some embodiments.

Next, as shown in FIG. 7, application 132 transmits the selected shareable data to storage 140. The transmitted shareable data is stored in data storage 140 in association with an identifier of the user of user device 110. FIG. 7 also shows transmission of an authorization to data storage 140 to share the selected shareable data with application 152, which retrieves the data from data storage 140 based on the authorization.

Figure 8:
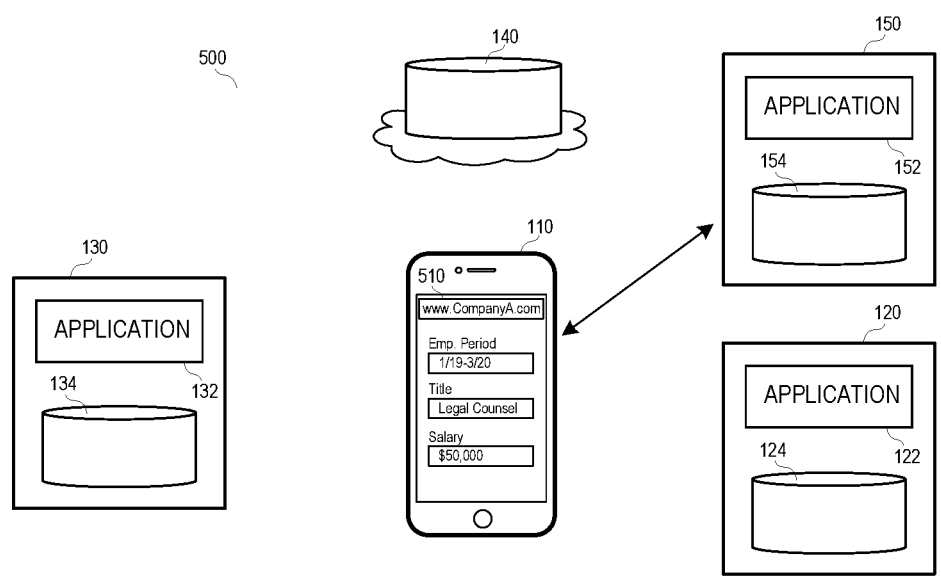
FIG. 8 is a block diagram illustrating shared verified user data acquired by a data requestor according to some embodiments.

FIG. 8 illustrates user interface 510 of application 152 including fields Employment Period, Title, and Salary populated by the data received from data storage 140. Application 152 may then proceed with a recruiting process based on this verified data. As mentioned above, the Trade My Data application may populate user interface 510 directly with data received from application 132 in some embodiments.

Figure 9:
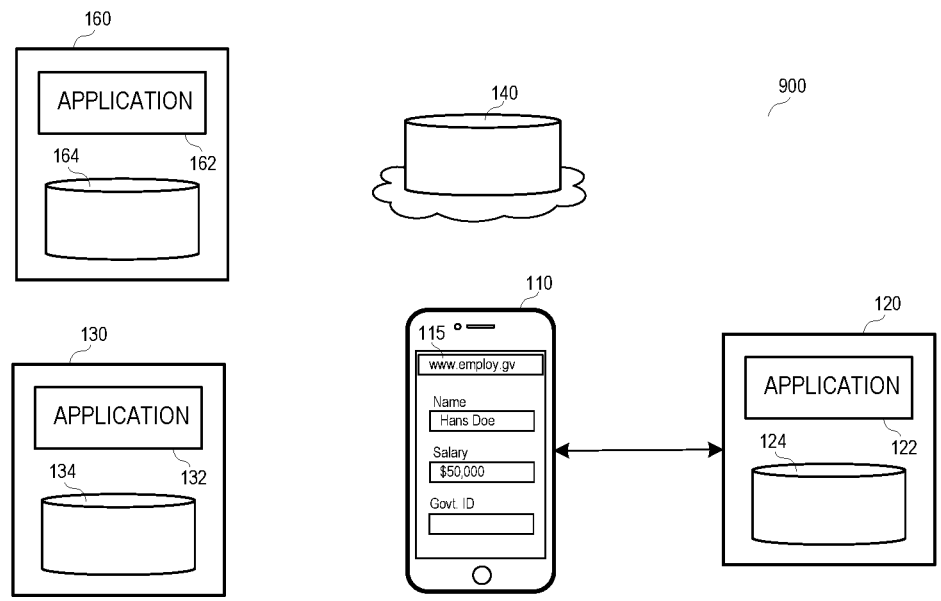
FIG. 9 is a block diagram illustrating a request for user data according to some embodiments.

FIG. 9 is a block diagram of architecture 900 including the components of architecture 100 of FIG. 1 as well as platform 160. Platform 160 may be managed by a governmental agency and may execute application 162 to manage personal identity information stored in data store 164.

User device 110 of FIG. 9 presents interface 115 after execution of the process described with respect to FIGS. 1 through 4. The input fields Name, Salary are completed but the input field Government ID remains empty. The user requires information stored in data store 134 in order to complete the input field Government ID.

Figure 10:
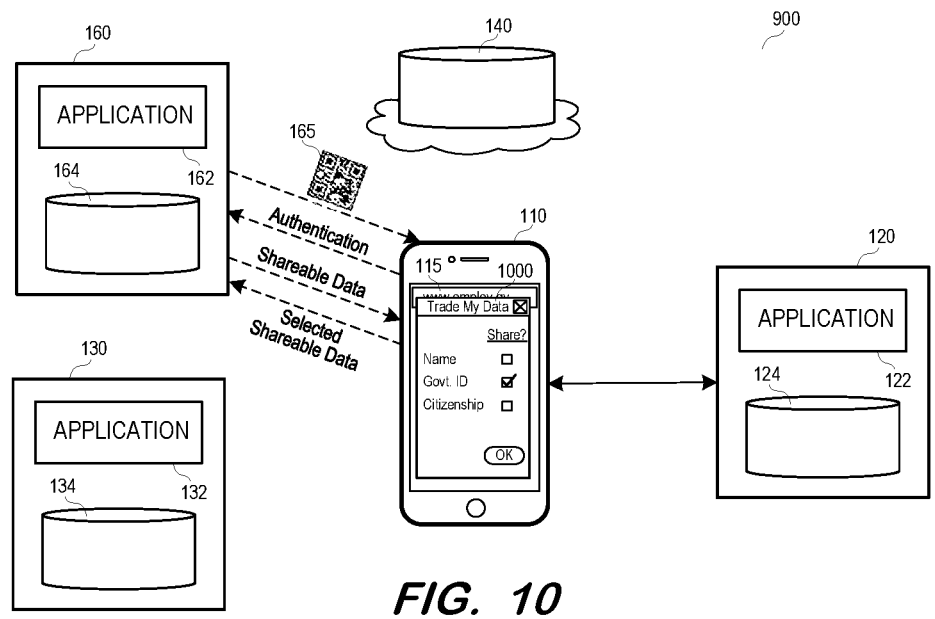
FIG. 10 is a block diagram illustrating designation of verified user data for sharing with a data requestor according to some embodiments.

User device 110 therefore scans QR code 165, which was provided to the user by the operator of application 162 in any suitable manner. In response, the Trade My Data application is invoked and user interface 1000 is presented overlaid on user interface 115 as shown in FIG. 10. QR code 165 includes a request for authentication with application 132 and a request for a list of shareable data which may be provided by application 132. The Trade My Data application and resulting subsequent requests may be invoked using any other suitable mechanism, such as but not limited to scanning an NFC tag, selecting a hyperlink, or establishing a Bluetooth connection.

User interface 1000 lists the user-associated shareable data stored in data store 164. The data in the present example includes Name, Government ID and Citizenship. The user has selected Government ID in view of the data needed to complete the input fields of user interface 115. The user then selects the OK control of user interface 1000, causing the Trade My Data application to returns an identifier of the selected shareable data to application 162.

Figure 11:
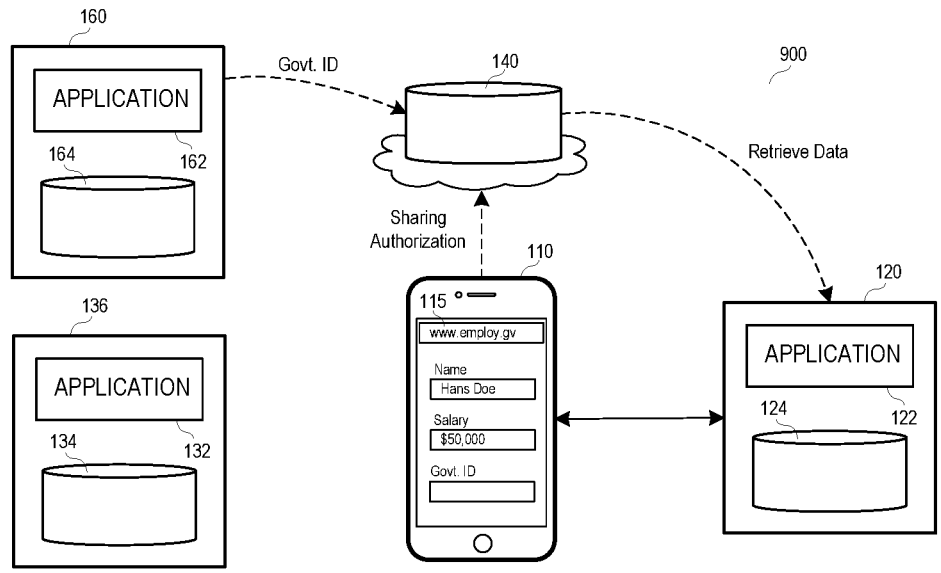
FIG. 11 is a block diagram illustrating authorized sharing of verified user data with a data requestor according to some embodiments.

Application 162 transmits the selected shareable data to storage 140 as shown in FIG. 11. Transmission of the selected shareable data to storage 140 may include authentication of application 162, and the shareable data is stored in data storage 140 in association with an identifier of the user with whom the data is associated. FIG. 11 also shows user interface 115, with user interface 1000 having been dismissed.

The Trade My Data application transmits an indication to data storage 140 to share the selected shareable data with application 122. The data is retrieved from data storage 140 by application 122 based on this indication. For example, application 122 may query data storage 140 for the data, and data storage 140 may provide the data in view of the prior indication to share this data with application 122.

Figure 12:
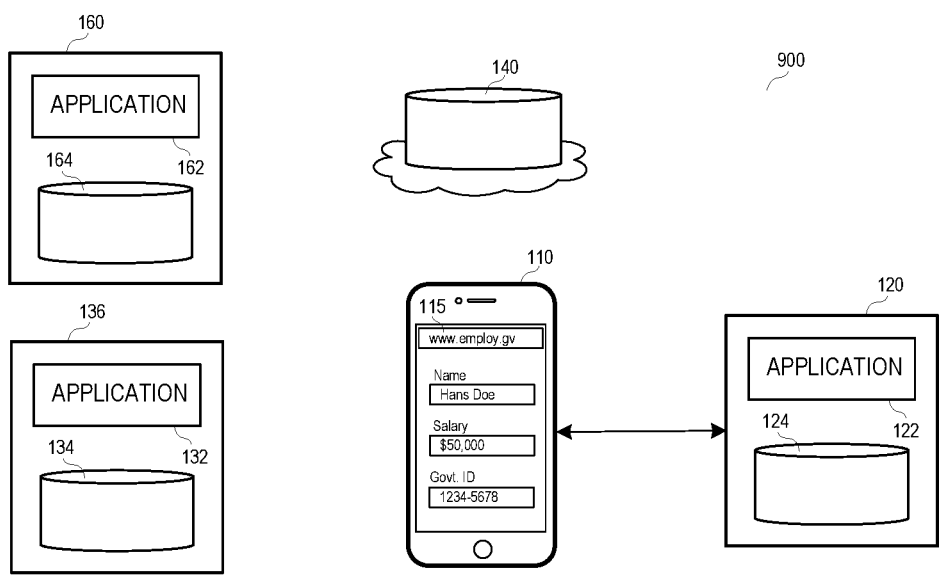
FIG. 12 is a block diagram illustrating shared verified user data acquired by a data requestor according to some embodiments.

FIG. 12 illustrates user interface 115 of application 122 including populated Name, Salary and Government ID fields. As described above, the Trade My Data application facilitates retrieval of the data from two different verified data sources and the population of user interface 115 with the data.

Figure 13:
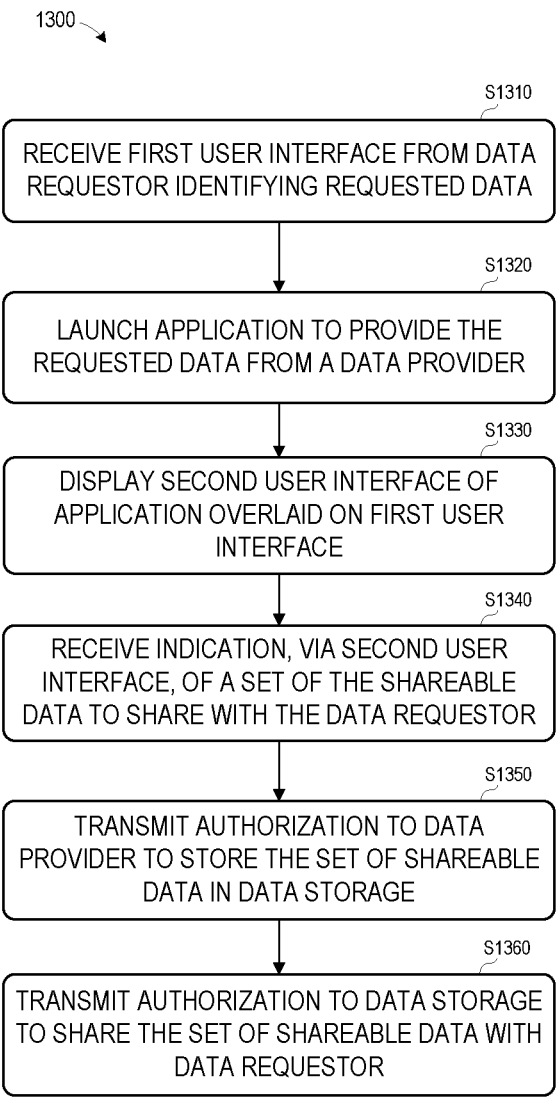
FIG. 13 is a flow diagram of a process to share user data with a data requestor according to some embodiments.

FIG. 13 comprises a flow diagram of a process to share user data with a data requestor according to some embodiments. Process 1300 and all other processes mentioned herein may be embodied in processor-executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software.

Initially, at S1310, a first user interface is received from a data requestor. The first user interface identifies the data being requested by the data requestor. As described above, the first user interface may be received at S1310 by a user device from the data requestor. A user of the user device may desire a function or service provided by the data requestor, and the data requestor may require certain data from the user in order to provide the function or service to the user. Accordingly, the user device transmits an HTTP request to the data requestor and in response the data requestor provides a Web page to the user device including the first user interface.

At S1320, an application is launched to provide the requested data from a data provider. In some embodiments, a QR code is scanned by the user device, which causes the user device to launch a thusly-configured application. Launching the application results in display of a second user interface of the application overlaid on the first user interface at S1330. A portion of the first user interface may be visible outside of the display footprint of the second user interface.

Figure 14:
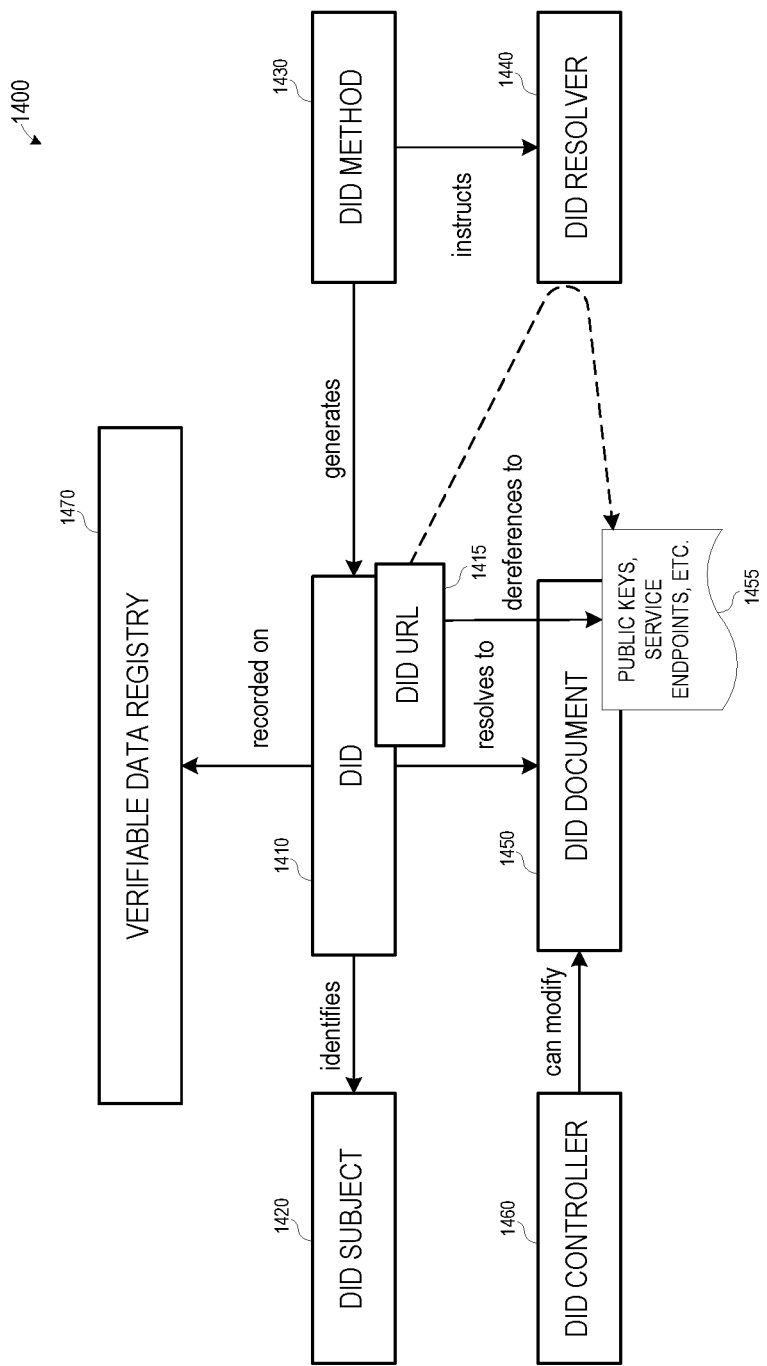
FIG. 14 depicts entity validation according to some embodiments.

Launching of the application also includes performance of a sequence of steps, which may be encoded in the QR code. First, the user device performs an authentication procedure with the data provider associated with the QR code. FIG. 14 depicts entity validation architecture 1400 for performing such an authentication procedure according to some embodiments. DID 1410 identifies DID subject 1420. DID subject 1420 may be any entity such as but not limited to a person, a group, an organization, a physical thing, and a logical thing.

DID 1410 is generated by a DID scheme defined in DID method 1430. DID method 1430 is the mechanism by which a particular type of DID 1410 and its associated DID document 1450 are created, resolved, updated, and deactivated using a particular verifiable data registry 1470. For example, in order to be resolvable to DID document 1450, DIDs are typically recorded on an underlying system or network. Regardless of the specific technology used, any such system that supports recording DIDs and returning data necessary to produce DID documents is referred to as a verifiable data registry. Examples of verifiable data registry 1470 include distributed ledgers, decentralized file systems, databases, peer-to-peer networks, and other forms of trusted data storage.

DID document 1450 contains metadata associated with DID 1410 and may express verification methods (such as public keys) and services relevant to interactions with DID subject 1420. The properties of DID document 1450 may be updated according to applicable operations specified in DID method 1430.

DID URL 1415 extends the syntax of DID 1410 to incorporate other standard URI components (e.g., path, query, fragment) in order to locate a particular resource. The resource may be a public key 1444 inside DID document 1450, or a resource available external to DID document 1450.

DID resolver 1440 is a software and/or hardware component that produces a conforming DID document 1450 (and associated metadata) from DID 1410. The specific steps for resolving a specific type of DID 1410 are defined by the relevant DID method 1430. Similarly, a resource 1455 (and associated metadata) may be generated from DID URL (and associated options) 1415 in a process known as dereferencing.

DID controller 1460 of DID 1410 is an entity (e.g., person, organization, or autonomous software) that is capable of modifying DID document 1450 according to DID method 1430. This capability is typically asserted by the control of a set of cryptographic keys used by software acting on behalf of DID controller 1460. DID 1410 may be associated with more than one controller and DID controller 1460 may include DID subject 1420.

Similar to other authentication methods, DID relies on a challenge-response cycle in which a relying party authenticates the DID of an identity owner. During this cycle, an identity owner demonstrates control of their authentication material that was generated and distributed during DID creation through execution of the authentication-proof mechanism. If the DID is known at the time of challenge construction, then the relying party may use the contents of the DID document to select preferred authentication methods or service endpoints. The challenge that is sent by the relying party may or may not itself contain a proof of the relying party's control of a DID.

Based on the challenge, the identity owner constructs a response that proves control of their DID. This may involves a cryptographic signature but can include other proof mechanisms. After receiving the response, the relying party resolves the identity owner's DID, and verifies that the response is valid for a prior challenge, for example, by verifying the response signature using a public key contained in the DID document.

The second user interface indicates a list of shareable data received from the data provider. The list is intended to include at least a portion of the data requested by the data requestor. At S1340, an indication of a set of the shareable data to share with the data requestor is received via second user interface. For example, a user may select checkboxes associated with any of the listed shareable data which the user consents to share with the data requestor.

Authorization is transmitted from the application on the user device to the data provider at S1350 to store the selected set of shareable data in data storage. The selected set is stored in association with an identifier of the user, which may be determined from the authentication procedure described above. The application on the user device also transmits authorization to the data storage at S1360 to share the set of shareable data with data requestor. Accordingly, the set of shareable data may be pushed from the data storage to the data requestor or retrieved from the data storage by the data requestor in response to a query. The query specifies the desired data and the identity of the associated user, and the data storage may confirm that the user has consented to sharing the desired data with the data provider.

Figure 15:
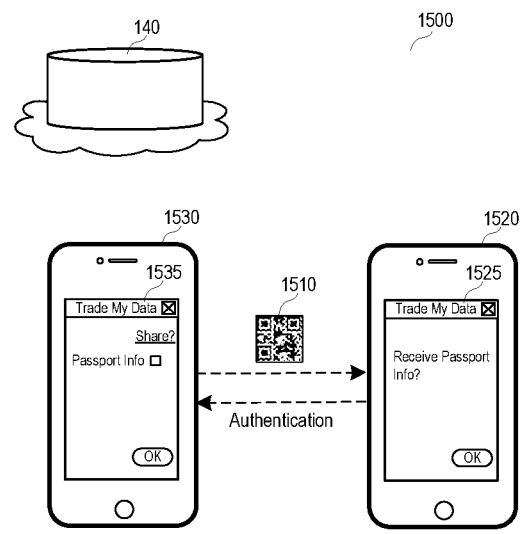
FIG. 15 is a block diagram illustrating a user-initiated request to share data with according to some embodiments.

FIG. 15 illustrates architecture 1500 in which a user operates the Trade My Data application executing on user device 1530 to share data with device 1520 according to some embodiments. The data may comprise data stored in data store 140 in association with the user. Such data may include credentials or other data managed by a third-party and preference data or other data stored by the user directly into data store 140 using the Trade My Data application. Stored credentials may consist of identifiers of verified credentials (and/or of associated proofs) which reference a single source of truth (i.e., the actual credential) stored by the corresponding credential-issuing entity.

For example, user interface 1535 is a user interface of a Trade My Data application executing on user device 1530. The user of device 1530 has operated the application to instruct the application to share data associated with the user. Accordingly, the application may provide QR code 1510 to device 1520 as an electronic image, a hardcopy printout, etc.

Device 1520 scans QR code 1510, which causes launching of a Trade My Data application executing on device 1520. As described above, scanning of QR code 1530 also initiates authentication with user device 1530. User interface 1525 of the Trade My Data application specifies the data to be shared and allows an operator of device 1520 to agree to receive the data. Once agreed, a request for the data is transmitted to user device 1530. In the present example, the requested data is passport information.

User interface 1535 of a Trade My Data application allows the user of user device 1530 to indicate whether the requested data should be shared with the requestor. Since the sharing was initiated by the user of user device 1530, the user may select the displayed checkbox and OK control of user interface 1530.

Figure 16:
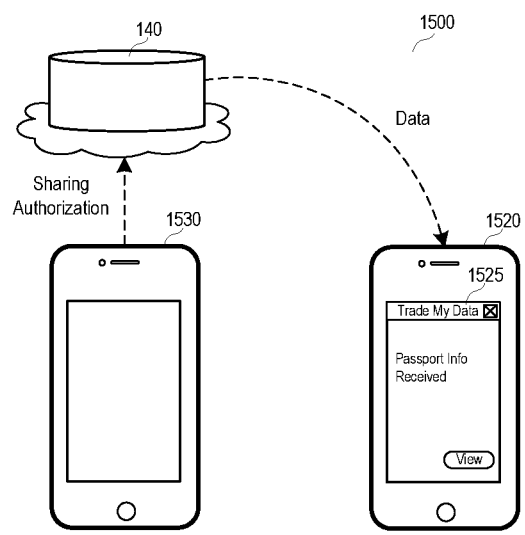
FIG. 16 is a block diagram illustrating sharing of data according to some embodiments.

FIG. 16 illustrates the sharing of the data specified in FIG. 15. User device 1530 executes its Trade My Data application to provide data store 140 with authorization and instructions to share the data with user device 1520. User device 1520 receives the data at its Trade My Data application from data store 140 and user interface 1525 indicates that the shared data was received.

Figure 17:
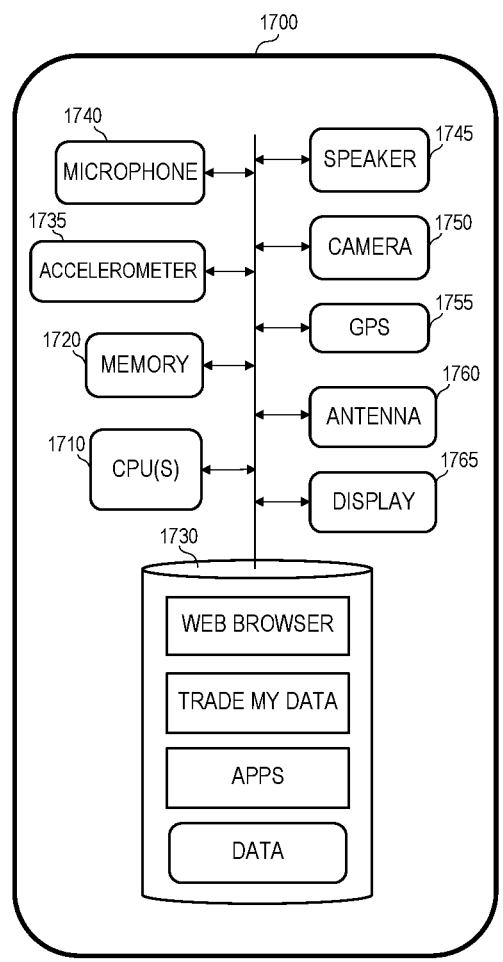
FIG. 17 is a block diagram of a hardware system for executing a data sharing application according to some embodiments.

FIG. 17 is a block diagram of a hardware system for executing a data sharing application according to some embodiments. Hardware system 1700 may comprise a smartphone but embodiments are not limited thereto. Hardware system 1700 may include other unshown elements according to some embodiments.

Hardware system 1700 includes central processing unit(s) 1710 operatively coupled to memory 1720, which may comprise volatile RAM devices. Data storage device 1730 stores program code loaded into memory 1720 and executed by processing unit(s) 1710 to cause system 1700 to implement any of the components and execute any one or more of the processes described herein. Data storage device 1730 may comprise any appropriate persistent storage device such as a solid-state non-volatile RAM device.

Data storage device 1730 stores program code of a Web browser and a Trade My Data application as described herein. Data storage device 1730 may also store data and other program code (i.e., apps) for providing additional functionality and/or which are necessary for operation of hardware system 1700, the latter including device drivers, operating system files, etc.

System 1700 includes input devices such as accelerometer 1735, microphone 1740, camera 1750 and output devices such as speaker 1745 and display 1765. Display 1765 may present user interfaces as described herein. GPS component 1755 provides location-based information. System 1700 may transmit data to and receive data from other devices over a cellular network, a Bluetooth connection or a wireless internet network via antenna 1760.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a display;
a memory storing processor-executable program code; and
a processing unit to execute the processor-executable program code to cause the system to:
receive a first user interface from a data requestor;
display the first user interface on the display, the displayed first user interface identifying data requested by the data requestor;
launch an application to provide the requested data;
display a second user interface of the application on the display overlaid on the first user interface;
receive identifiers of shareable data from a data provider and display the identifiers in the second user interface;
receive an indication, via the second user interface, of a set of the shareable data to share with the data requestor;
in response to the indication:
transmit an authorization to the data provider to store the set of shareable data in a data storage; and
transmit a second authorization to the data storage to share the set of shareable data with the data requestor;
receive second identifiers of second shareable data from a second data provider and display the second identifiers in the second user interface;

receive a second indication, via the second user interface, of a second set of the second shareable data to share with the data requestor; and in response to the second indication:
   transmit a third authorization to the second data provider to store the second set of shareable data in the data storage; and
   transmit a fourth authorization to the data storage to share the second set of shareable data with the data requestor.

2. A system according to claim 1, the processing unit to execute the processor-executable program code to cause the system to:
   receive the set of shareable data from the data provider; and
   populate the first user interface with the received set of shareable data.

3. A system according to claim 1, wherein launch of the application to provide the requested data comprises:
   scanning of a code associated with the data provider; and
   in response to scanning of the code:
   determine that the application is associated with the code;
   launch the application in response to the determination that the application is associated with the code;
   perform an authentication procedure with the data provider; and
   request the identifiers of shareable data from the data provider.

4. A system according to claim 3, wherein the code is a QR code.

5. A system according to claim 1, wherein launch of the application to provide the requested data comprises:
   scanning of a code associated with the data provider; and
   in response to scanning of the code:
   determine that the application is associated with the code;
   launch the application in response to the determination that the application is associated with the code;
   perform an authentication procedure with the data provider; and
   request the identifiers of shareable data from the data provider, and
   wherein the processing unit is to execute the processor-executable program code to cause the system to:
   scan a second code associated with the second data provider; and
   in response to scanning of the second code:
   perform a second authentication procedure with the second data provider; and
   request the second identifiers of second shareable data from the second data provider.

6. A system according to claim 1, the processing unit to execute the processor-executable program code to cause the system to:
   receive the set of shareable data from the data provider;
   populate the first user interface with the received set of shareable data;
   receive a third user interface from a second data requestor;
   display the second user interface on the display, the displayed second user interface identifying second data requested by the second data requestor;
   launch the application to provide the second requested data;
   display the second user interface of the application on the display overlaid on the third user interface;
   receive the identifiers of shareable data from the data provider and display the identifiers in the second user interface;
   receive a third indication, via the second user interface, of a third set of the shareable data to share with the second data requestor;
   in response to the third indication:
   transmit a fifth authorization to the data provider to store the third set of shareable data in the data storage; and
   transmit a sixth authorization to the data storage to share the third set of shareable data with the second data requestor;
   receive the third set of shareable data from the data provider; and
   populate the third user interface with the received third set of shareable data.

7. A method comprising:
   receiving a first user interface from a data requestor;
   displaying the first user interface on the display, the displayed first user interface identifying data requested by the data requestor;
   launching an application to provide the requested data;
   displaying a second user interface of the application on a display overlaid on the first user interface;
   receiving identifiers of shareable data from a data provider and display the identifiers in the second user interface;
   receiving an indication, via the second user interface, of a set of the shareable data to share with the data requestor;
   in response to the indication:
   transmitting an authorization to the data provider to store the set of shareable data in a data storage; and
   transmitting a second authorization to the data storage to share the set of shareable data with the data requestor
   receiving second identifiers of second shareable data from a second data provider and display the second identifiers in the second user interface;
   receiving a second indication, via the second user interface, of a second set of the second shareable data to share with the data requestor; and
   in response to the second indication:
   transmitting a third authorization to the second data provider to store the second set of shareable data in the data storage; and
   transmitting a fourth authorization to the data storage to share the second set of shareable data with the data requestor.

8. A method according to claim 7, further comprising:
   receiving the set of shareable data from the data provider; and
   populating the first user interface with the received set of shareable data.

9. A method according to claim 7, wherein launching of the application to provide the requested data comprises:
   scanning a code associated with the data provider; and
   in response to scanning of the code:
   determining that the application is associated with the code;
   launching the application in response to the determination that the application is associated with the code;
   performing an authentication procedure with the data provider; and
   requesting the identifiers of shareable data from the data provider.

10. A method according to claim 9, wherein the code is a QR code.

11. A method according to claim 7, wherein launching the application to provide the requested data comprises:
scanning a code associated with the data provider; and
in response to scanning of the code:
determining that the application is associated with the code;
launching the application in response to the determination that the application is associated with the code;
performing an authentication procedure with the data provider; and
requesting the identifiers of shareable data from the data provider, and
the method further comprising:
scanning a second code associated with the second data provider; and
in response to scanning of the second code:
performing a second authentication procedure with the second data provider; and
requesting the second identifiers of second shareable data from the second data provider.

12. A method according to claim 7, further comprising:
receiving the set of shareable data from the data provider;
populating the first user interface with the received set of shareable data;
receiving a third user interface from a second data requestor;
displaying the second user interface on the display, the displayed second user interface identifying second data requested by the second data requestor;
launching the application to provide the second requested data;
displaying the second user interface of the application on the display overlaid on the third user interface;
receiving the identifiers of shareable data from the data provider and display the identifiers in the second user interface;
receiving a third indication, via the second user interface, of a third set of the shareable data to share with the second data requestor;
in response to the third indication:
transmitting a third-fifth authorization to the data provider to store the third set of shareable data in the data storage; and
transmitting a sixth authorization to the data storage to share the third set of shareable data with the second data requestor;
receiving the third set of shareable data from the data provider; and
populating the third user interface with the received third set of shareable data.

13. A non-transitory computer-readable medium storing program code executable by a processing unit to:
receive a first user interface from a data requestor;
display the first user interface on the display, the displayed first user interface identifying data requested by the data requestor;
launch an application to provide the requested data;
display a second user interface of the application on a display overlaid on the first user interface;
receive identifiers of shareable data from a data provider and display the identifiers in the second user interface;
receive an indication, via the second user interface, of a set of the shareable data to share with the data requestor;
in response to the indication:
transmit an authorization to the data provider to store the set of shareable data in a data storage; and
transmit a second authorization to the data storage to share the set of shareable data with the data requestor
receive second identifiers of second shareable data from a second data provider and display the second identifiers in the second user interface;
receive a second indication, via the second user interface, of a second set of the second shareable data to share with the data requestor; and
in response to the second indication:
transmit a third authorization to the second data provider to store the second set of shareable data in the data storage; and
transmit a fourth authorization to the data storage to share the second set of shareable data with the data requestor.

14. A medium according to claim 13, the program code executable by a processing unit to:
receive the set of shareable data from the data provider; and
populate the first user interface with the received set of shareable data.

15. A medium according to claim 13, wherein launch of the application to provide the requested data comprises:
scanning of a code associated with the data provider; and
in response to scanning of the code:
determine that the application is associated with the code;
launch the application in response to the determination that the application is associated with the code;
perform an authentication procedure with the data provider; and
request the identifiers of shareable data from the data provider.

16. A medium according to claim 13, wherein launch of the application to provide the requested data comprises:
scanning of a code associated with the data provider; and
in response to scanning of the code:
determine that the application is associated with the code;
launch the application in response to the determination that the application is associated with the code;
perform an authentication procedure with the data provider; and
request the identifiers of shareable data from the data provider, and
wherein the program code is executable by a processing unit to:
scan a second code associated with the second data provider; and
in response to scanning of the second code:
perform a second authentication procedure with the second data provider; and
request the second identifiers of second shareable data from the second data provider.

17. A medium according to claim 13, the program code executable by a processing unit to:
receive the set of shareable data from the data provider;
populate the first user interface with the received set of shareable data;
receive a third user interface from a second data requestor;
display the second user interface on the display, the displayed second user interface identifying second data requested by the second data requestor;
launch the application to provide the second requested data;

display the second user interface of the application on the display overlaid on the third user interface;
receive the identifiers of shareable data from the data provider and display the identifiers in the second user interface;
receive a third indication, via the second user interface, of a third set of the shareable data to share with the second data requestor;
in response to the third indication:
  transmit a fifth authorization to the data provider to store the third set of shareable data in the data storage; and
  transmit a sixth authorization to the data storage to share the third set of shareable data with the second data requestor;
receive the third set of shareable data from the data provider; and
populate the third user interface with the received third set of shareable data.

* * * * *